(12) United States Patent
Elder (10) Patent No.: US 7,249,055 B1
(45) Date of Patent: Jul. 24, 2007

(54) METHOD AND SYSTEM FOR MANAGING AND CONDUCTING A NETWORK AUCTION

(75) Inventor: Richard Elder, New York, NY (US)

(73) Assignee: Citicorp Credit Services, Inc., New York, NY (US)

( * ) Notice: Subject to any disclaimer, the term of this patent is extended or adjusted under 35 U.S.C. 154(b) by 1093 days.

(21) Appl. No.: 09/610,540

(22) Filed: Jul. 7, 2000

Related U.S. Application Data (60) Provisional application No. 60/143,021, filed on Jul. 9, 1999.

(51) Int. Cl.
*G06Q 30/00* (2006.01)

(52) U.S. Cl. .............................. 705/26; 705/1; 705/27; 705/37; 705/39; 705/40; 235/379

(58) Field of Classification Search ................. 705/26, 705/27, 37, 28, 39; 702/187; 235/379
See application file for complete search history.

(56) References Cited

U.S. PATENT DOCUMENTS

| | | | | |
|---|---|---|---|---|
| 4,974,252 | A | | 11/1990 | Osborne ...................... 379/92 |
| 5,426,281 | A | * | 6/1995 | Abecassis ................... 235/379 |
| 5,664,115 | A | | 9/1997 | Fraser ......................... 705/37 |
| 5,717,989 | A | | 2/1998 | Tozzoli et al. ................ 705/37 |
| 5,794,207 | A | * | 8/1998 | Walker et al. ................. 705/1 |
| 5,890,138 | A | | 3/1999 | Godin et al. ................. 705/26 |
| 5,924,083 | A | | 7/1999 | Silverman et al. ............ 705/37 |
| 5,999,915 | A | * | 12/1999 | Nahan et al. ................. 705/27 |
| 6,018,722 | A | | 1/2000 | Ray et al. ..................... 705/36 |
| 6,021,943 | A | | 2/2000 | Chastain ..................... 235/379 |
| 6,023,686 | A | | 2/2000 | Brown ......................... 705/37 |
| 6,084,528 | A | | 7/2000 | Beach et al. ............ 340/825.35 |
| 6,202,051 | B1 | * | 3/2001 | Woolston ...................... 705/27 |
| 6,260,024 | B1 | * | 7/2001 | Shkedy ......................... 705/37 |
| 6,567,768 | B1 | * | 5/2003 | Matos et al. ................. 702/187 |
| 2001/0018665 | A1 | * | 8/2001 | Sullivan et al. ............... 705/14 |
| 2001/0039529 | A1 | * | 11/2001 | Hoffman ....................... 705/37 |
| 2001/0047308 | A1 | * | 11/2001 | Kaminsky et al. ............ 705/26 |

(Continued)

OTHER PUBLICATIONS

"eBay Launches the Most Comprehensive Trust and Safety Upgrades to the World's Largest Person-To-Person Trading Site" (Jan. 15, 1999. PR Newswire).*

(Continued)

*Primary Examiner*—Yogesh C. Garg
(74) *Attorney, Agent, or Firm*—George T. Marcou; Kilpatrick Stockton LLP (57) ABSTRACT

There is described a method and system for managing Internet auction transactions by creating an auction website by, for example, a financial institution. The auction website is accessible by the financial institution's account holders (e.g., holders of checking, savings, credit card, and investment accounts). Thus, all buyers and sellers in auction transactions on the auction site, for example, have accounts with the financial institution, with settlements occurring between the accounts of the users at the financial institution. Payments are debited from the buyer's account(s) with a credit going to the account of the seller, less any fees. All charges occur internally, so no interchange is owed, for example, to a card association in connection with a transaction. Financial institution customers benefit from the system in that buyers and sellers are authenticated and settlement occurs almost instantaneously.

5 Claims, 7 Drawing Sheets

U.S. PATENT DOCUMENTS

| | | | |
|---|---|---|---|
| 2002/0010634 A1* | 1/2002 | Roman et al. | 705/26 |
| 2002/0019785 A1* | 2/2002 | Whitman | 705/28 |
| 2002/0026418 A1* | 2/2002 | Koppel et al. | 705/41 |
| 2003/0195843 A1* | 10/2003 | Matsuda et al. | 705/39 |

OTHER PUBLICATIONS

"Online Auctions Named No. 1 Internet Fraud Complaint for 1998" (Feb. 23, 1999. U.S. News Wire).*

Press release, "Web Alliance Sets Tough New Standards For Internet Auctions And Classifieds, As Consumer Sites Team Up To Make Person-To Person Buying And Selling Safer"; PR Newswire; New York; Dec. 2, 1998; extracted on Internet on Sep. 17, 2004.*

Notification of Transmittal of the International Search Report or the Declaration for PCT/US00/18582 and the corresponding International Search Report dated Oct. 3, 2000.

Deutsche 24 and eBay to Co-operate on Internet Auctions (Deutsche 24 und eBay kooperieren bei Internet-Auktionen), Borsen-Zeitung, Mar. 23, 2000, p. 8.

Paybyweb.com Offers "Consumer-Safe" Transaction Processing to Buyers and Sellers on ebay.com and Other Auction Sites, Business Wire, Aug. 5, 1999.

"Sellers Get a Wider Audience and Byers Dont't Have to Leave Their Offices or Farms," Rick Barrett, Madison Newspapers, Feb. 15, 1998.

www.ebay.com, Jul. 2, 1999, 12 pages.

www.ebay.com, Nov. 2, 2000, 18 pages.

* cited by examiner

METHOD AND SYSTEM FOR MANAGING AND CONDUCTING A NETWORK AUCTION

CROSS-REFERENCE TO RELATED APPLICATIONS

This application claims priority to provisional application Ser. No. 60/143,021 filed Jul. 9, 1999 which is incorporated herein by reference in its entirety.

BACKGROUND OF THE INVENTION

1. Field of the Invention

The present invention relates generally to the field of electronic commerce and more particularly to a method and system for managing auction transactions over a network, such as the Internet.

2. Description of the Related Art

Currently, a buyer participating in an auction, for example, over the Internet, does not really know if the purported seller actually exists, and neither does a seller in such an auction know whether the purported buyer actually exists. Therefore, a buyer who enters the winning bid takes a chance on the existence of the purported seller, as well as whether he or she will ever get the merchandise on which the bid was entered. Likewise, a seller who accepts the winning bid rakes a chance on the existence of the buyer who purported to enter the winning bid.

Typically, in such an auction, a user at a terminal, such as the user's personal computer (PC) accesses an auction page on the Internet, such as E-BAY and goes through a registration process. Registering basically means that the user at the user's PC enters the user's address, such as an e-mail address, and an e-mail is sent to the user, for example, at the user's PC, which tells the user that he or she is allowed to bid. The user is also given, for example, a bidding name, and the user sets up a password on the system.

It is well known that anyone, can set up an Internet account for an e-mail address with a service provider, such as AOL or the like, and it is possible for a party to secure an e-mail address while concealing his or her true identity. It is also possible for someone to use another party's e-mail address on an unauthorized basis, and e-mail addresses are commonly stolen and used without the owner's authorization. In short, there are no guarantees associated with an &mail address as to any identifying characteristics (e.g., age, gender, status) of the user of the e-mail address.

When the user registers on the auction page with the user's e-mail address and receives a bidding name, the user is ready to bid or list with the auction site. In the case of auction sites as with auction houses, at least one of the seller and buyer pays a fee for the opportunity to use the auction site. Usually the seller pays for the ability to list and sometimes pays an additional fee in the form of a percentage of the eventual selling price. The procedure varies for some auction houses, such as SOTHEBY'S, in which the buyer pays the fees. However, as a general rule, it is the seller who pays the fees, and the auction house generally bills or invoices the seller once a month. Upon receipt of the invoice, the seller generally pays, for example, by writing a check, although sometimes sellers can pay by credit card In the case of Internet auction sites, most people selling at auction over the Internet are not what we typically think of as merchants. Rather, they are simply individuals, and when they sell something, they are not usually equipped to receive payment by any means (e.g., credit card) other than by check, money order, or the like. This causes inconveniences for both parties, since the buyer must actually write a check or obtain a money order and then the buyer must wait until the seller is satisfied that the check will clear, etc., before the good(s) are transferred.

Internet auctions include, for example, normal auctions in which people enter bids and the bid price goes up as people bid higher and higher, as well as what are called Dutch auctions. In a Dutch auction, the process begins at a certain price, and the price goes down until somebody makes an offer at the current price. In a Dutch auction, effectively, someone wins the bid, because there are time frames. In other words, the bids are scheduled to end at a certain time, so they do not go continuously. In any event, when the bidding ends, the seller notifies the buyer via e-mail that the buyer has won the bid and asks the buyer to send the seller payment, such as a check or a money order, for the purchase price plus, for example, a certain amount for shipping and handling.

Upon receipt of such e-mail, it is up to the buyer to either write a personal check and/or get a certified check or a money order, which means a trip to the Post Office or the financial institution, and send the check or money order, for example to an address for the seller given in the e-mail. It is readily apparent that when the buyer sends the check or money order to the seller, the buyer takes a substantial risk that the seller actually exists and/or that the buyer will actually receive the good(s) for which the buyer has paid. The buyer expects the seller to package and ship the good(s) to the buyer when the seller receives a money order or a certified check. However, if the buyer pays by personal check, the seller typically waits several weeks for the check to clear before packaging and shipping the good(s). While one auction house has recently started a voluntary verification process in which users can have themselves "verified" by paying a fee and sending information to a credit bureau, the process is voluntary and does not take place on both sides of a transaction.

Accordingly, there is currently a tremendous amount of uncertainty in Internet auction transactions, for example, as to whether buyers or sellers really exist. There is likewise also considerable uncertainty as to whether or not buyers will pay, and if they do pay, whether the payment funds are good. Further, if the funds are good, there is a tremendous amount of uncertainty about whether the buyer will actually get the merchandise for which the funds were paid. The risk is a seller's risk, as well as a buyer's risk. The buyer risks not receiving the merchandise for which the buyer paid. The seller's risk lies, for example, in putting the seller's merchandise up for auction and receiving a winning bid, and waiting a month or more to discover that the buyer does not exist or sent bad funds for payment.

SUMMARY OF THE INVENTION

Settlement of an Internet auction transaction occurs through the system of the financial institution that is sponsoring the auction website. It is not necessary, for example, for a credit card settlement to go through a card association. Rather, it is simply a matter of running the settlement through the financial institution's system and, in effect, the buyer buys something, for example, for ten dollars, so the financial institution takes ten dollars from or charges the buyer's account ten dollars, and the seller sells something, for example, for ten dollars, so the financial institution gives the seller a credit on the seller's account for ten dollars. Thus, the settlement is very much like having the buyer and seller present together and exchanging the funds instantaneously. The settlement is reported as a transaction on the account statements of both customers.

It is a feature and advantage of the present invention to provide a method and system for managing auction transactions over the Internet which removes the risk of non-authentic buyers and sellers by authenticating the buyer and seller in a transaction from the buyer's and seller's account information, respectively.

It is a further feature and advantage of the present invention to provide a method and system for managing Internet auction transactions which avoids the risk of non-payment and delayed shipment of good(s) by settling the transaction on accounts of the buyer and seller in the transaction.

To achieve the stated and other features, advantages and objects, an embodiment of the present invention provides a method and system for managing Internet auction transactions by creating an auction website by, for example, a financial institution. The auction website is accessible by the financial institution's account holders (e.g., holders of checking, savings, credit card, and investment accounts). Thus, all buyers and sellers in auction transactions on the auction site, for example, have accounts with the financial institution, with settlements occurring between the accounts of the users at the financial institution. Payments are debited from the buyer's account(s) with a credit going to the account of the seller, less any fees. All charges occur internally, so no interchange is owed, for example, to a card association in connection with the transaction. Financial institution customers benefit from the system in that buyers and sellers are authenticated and settlement occurs virtually instantaneously.

Additional objects, advantages and novel features of the invention will be set forth in part in the description which follows, and in part will become more apparent to those skilled in the art upon examination of the following, or may be learned by practice of the invention.

A first exemplary embodiment of the present invention is directed to a method for conducting an auction website operated by a sponsoring financial institution. The method includes: registering potential buyers and sellers for the auction website by verifying that the potential buyers and sellers have at least one active account with the sponsoring financial institution; upon verification of at least one active account, issuing an individual registration identification to each of the potential buyers and sellers having at least one active account with the sponsoring financial institution, wherein the individual registration identification is associated with the at least one active account; facilitating access to the auction website through a network; listing goods of registered sellers on the auction website; accepting bids from registered potential buyers for listed goods of registered sellers through the auction website; recognizing (i) a final bid amount for at least one good listed by a registered seller and (ii) a registered buyer who bids the final bid amount for the at least one good; prompting the registered buyer of the at least one good to select a buyer's payment account and the registered seller of the at least one good to select a seller's payment account; comparing the final bid amount to a pre-determined threshold amount to determine a preferred payment process, wherein the preferred payment process when the final bid amount is above the pre-determined threshold amount includes; debiting the buyer's selected payment account for the final bid amount; and depositing the final bid amount into an escrow account.

The first exemplary embodiment further includes facilitating settlement between the buyer payment account and the seller payment account both held at the sponsoring financial institution, wherein facilitating settlement between the buyer's payment account and the seller's payment account includes: setting a first time period within which the seller must deliver the good to the buyer; when the seller delivers the good to the buyer within the first time period, setting a second time period within which the buyer must inspect the goods to determine conformance; when the buyer determines that the good is non-conforming, setting a third time period within which the buyer either (iii) returns the rood to the seller or (iv) requests a bargaining session with the seller; when the buyer returns the Rood to the seller within the third time period, setting a fourth time period within which the seller inspects the good to determine if the Rood is in the same condition as it was in when it was originally sent to the buyer; and when the seller determines that the good is in the same condition, retrieving the final bid amount from the escrow account; and returning the final bid amount to the buyer's payment account.

A second exemplary embodiment of the present invention is directed to a method for conducting an auction website operated by a sponsoring financial institution. The method includes: registering potential buyers and sellers for the auction website by verifying that the potential buyers and sellers have at least one active account with the sponsoring financial institution; upon verification of at least one active account, issuing an individual registration identification to each of the potential buyers and sellers having at least one active account with the sponsoring financial institution, wherein the individual registration identification is associated with the at least one active account; facilitating access to the auction website through a network; listing goods of registered sellers on the auction website; accepting bids from registered potential buyers for listed goods of registered sellers through the auction website; recognizing (i) a final bid amount for at least one good listed by a registered seller and (ii) a registered buyer who bids the final bid amount for the at least one good; prompting the registered buyer of the at least one good to select a buyer's payment account and the registered seller of the at least one good to select a seller's payment account; comparing the final bid amount to a pre-determined threshold amount to determine a preferred payment process, wherein the preferred payment process when the final bid amount is above the pre-determined threshold amount includes: debiting the buyer's selected payment account for the final bid amount; and depositing the final bid amount into an escrow account.

The second exemplary embodiment further includes facilitating settlement between the buyer payment account and the seller payment account both held at the sponsoring financial institution, wherein facilitating settlement between the buyer's payment account and the seller's payment account includes: setting a first time period within which the seller must deliver the good to the buyer; setting a second time period within which the buyer must inspect the goods to determine conformance when the seller delivers the good to the buyer within the first time period; setting a third time period within which the buyer either (iii) returns the good to the seller or (iv) requests a bargaining session with the seller when the buyer determines that the good is non-conforming; setting a fourth time period within which the buyer and the seller negotiate a new bid price for the good when the buyer requests a bargaining session with the seller and the seller agrees to the bargaining session; comparing the final bid price to the new bid price to determine a difference, when an identical new bid price is received from both the buyer and seller within the fourth time period; retrieving the final bid price from the escrow account; returning an amount equal to the difference to the buyer's payment account; and crediting the seller's payment account with the new bid price.

A third exemplary embodiment of the present invention is directed to a method for conducting an auction website operated by a sponsoring financial institution. The method includes: registering potential buyers and sellers for the auction website by verifying that the potential buyers and sellers have at least one active account with the sponsoring financial institution; upon verification of at least one active account, issuing an individual registration identification to each of the potential buyers and sellers having at least one active account with the sponsoring financial institution, wherein the individual registration identification is associated with the at least one active account; facilitating access to the auction website through a network; listing goods of registered sellers on the auction website; accepting bids from registered potential buyers for listed goods of registered sellers through the auction website; recognizing (i) a final bid amount for at least one good listed by a registered seller and (ii) a registered buyer who bids the final bid amount for the at least one good; prompting the registered buyer of the at least one good to select a buyer's payment account and the registered seller of the at least one good to select a seller's payment account; comparing the final bid amount to a pre-determined threshold amount to determine a preferred payment process, wherein the preferred payment process when the final bid amount is below the pre-determined threshold amount includes: debiting the buyer's selected payment account for the final bid amount and crediting the seller's selected payment account with the final bid amount.

The third exemplary embodiment further includes facilitating settlement between the buyer payment account and the seller payment account both held at the sponsoring financial institution, wherein facilitating settlement between the buyer's payment account and the seller's payment account includes: setting a first time period within which the seller must deliver the good to the buyer; setting a second time period within which the buyer must inspect the goods to determine conformance when the seller delivers the good to the buyer within the first time period; setting a third time period within which the buyer either (iii) returns the good to the seller or (iv) requests a bargaining session with the seller when the buyer determines that the good is non-conforming; setting a fourth period within which the buyer and the seller negotiate a new bid price for the good when the buyer requests a bargaining session with the seller and the seller agrees to the bargaining session; comparing the final bid amount to the new bid price to determine a difference when an identical new bid price is received from both the buyer and seller within the fourth period; crediting an amount equal to the difference to the buyer's payment account; and debiting the seller's payment account for an amount equal to the difference.

DETAILED DESCRIPTION OF THE PREFERRED EMBODIMENTS

Figure 1:
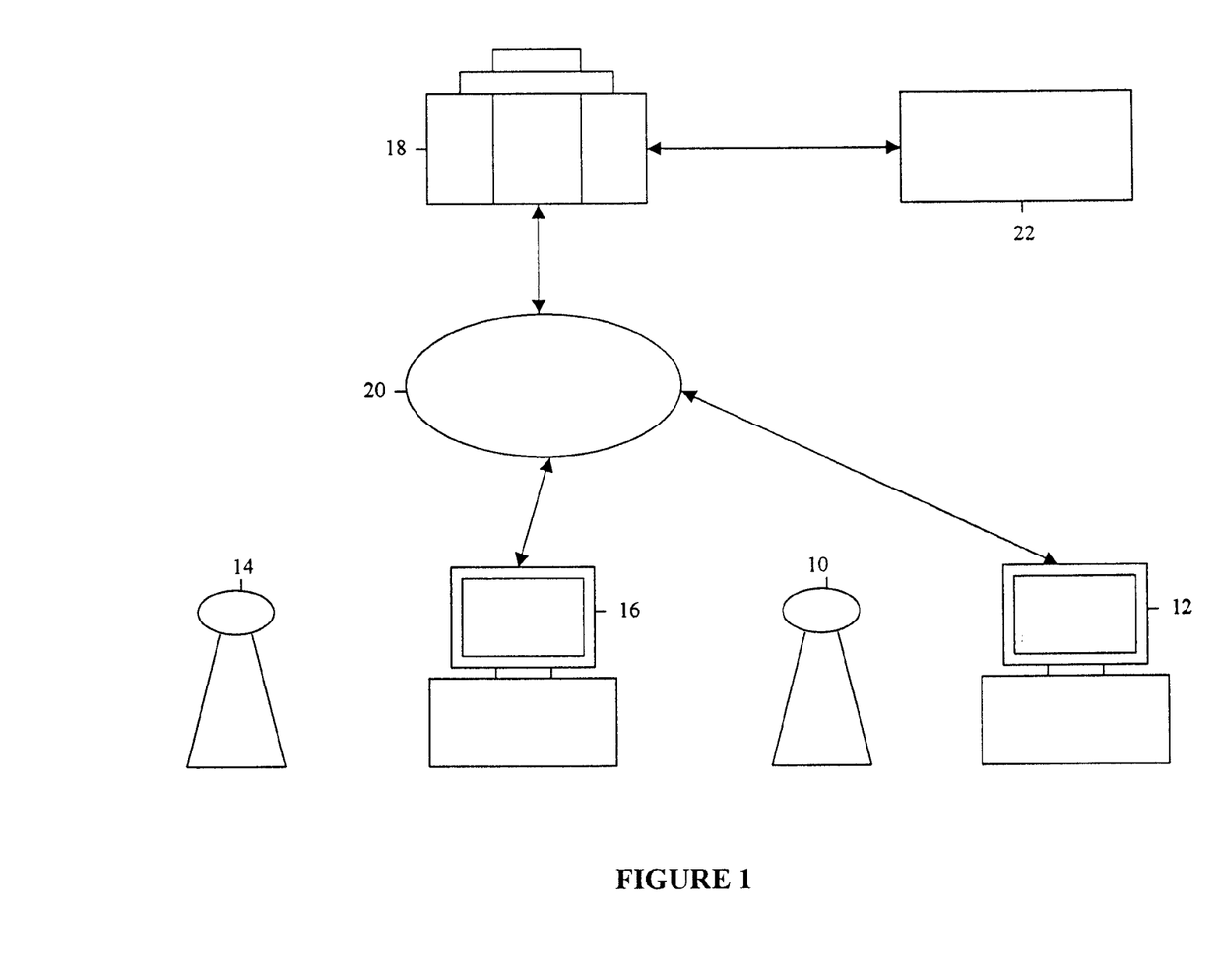
FIG. 1 is a schematic of the parties to an auction transaction according to an embodiment of the present invention.

Referring to FIG. 1 an embodiment of the present invention enables authentication of counterparties to an Internet auction transaction wherein both parties hold financial accounts with the provider of the auction website. An Internet auction transaction for an embodiment of the present invention involves, for example, a seller 10 at the seller's PC 12 and a buyer 14 at the buyer's PC 16, each accessing the auction page of the website server 18, for example, of a financial institution, over the Internet 20 or any other public or private network.

In an embodiment of the present invention, the seller is known to the financial institution as the holder of an account with the financial institution, and the buyer is likewise known to the financial institution as the holder of an account with the financial institution. Thus, there is a known financial institution account holder on both ends of the Internet auction transaction. The financial institution knows that both the seller and the buyer actually exist. When the transaction occurs, the payment is very simple, because the payment is made by the financial institution debiting the account of the buyer who bought the item at auction and crediting the account of the seller who sold it through a settlement system 22. Therefore, it is known that the parties are dealing with actual people, or at the very least, viable accounts and that once the transaction occurs, the seller will receive his or her funds. In a first preferred embodiment of the present invention, the funds transfer is virtually instantaneous, allowing the seller to have the benefit of the payment almost immediately. While in a second preferred embodiment of the present invention, the funds are held in escrow until the good(s) are received by the buyer, as discussed below.

Figure 2:
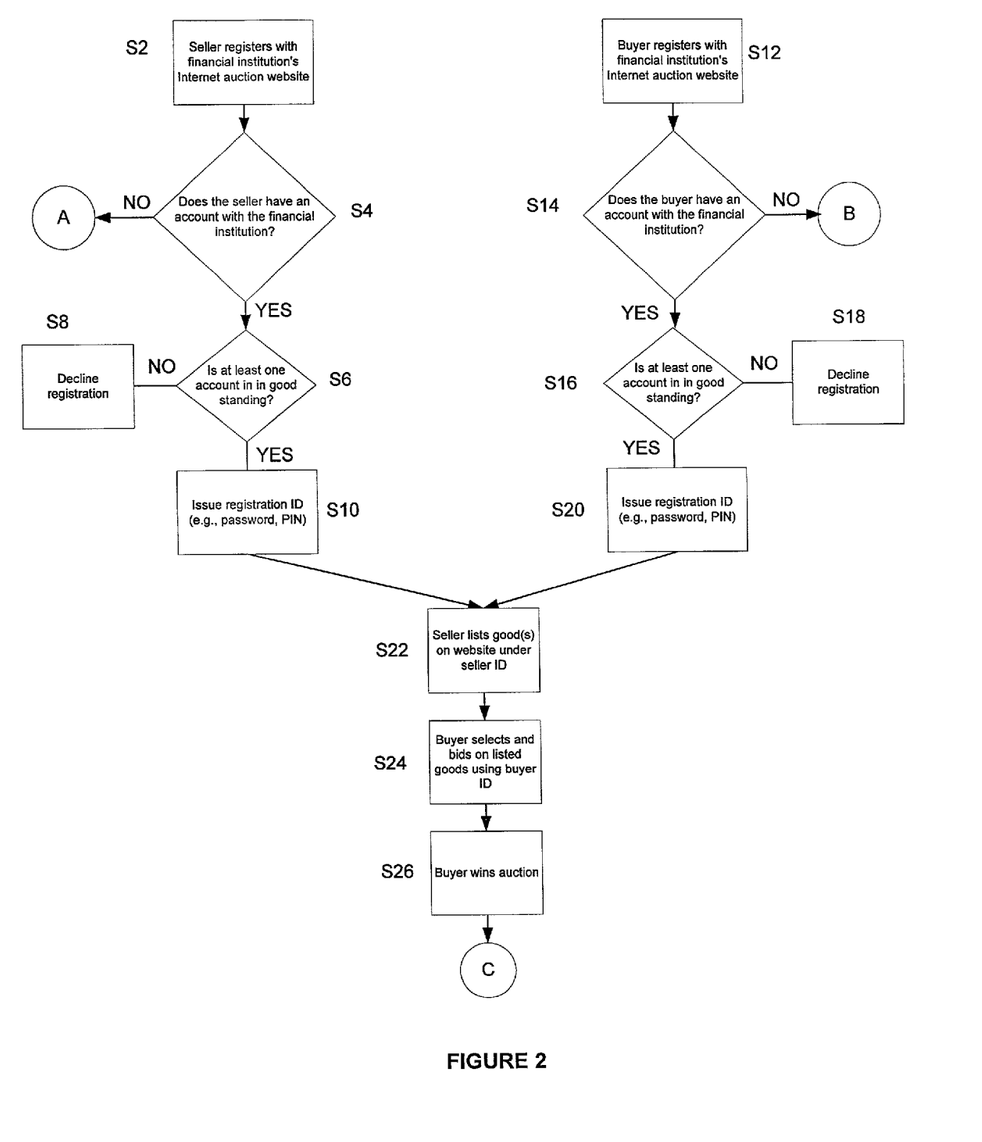
FIG. 2 is a registration process according to an embodiment of the present invention.

Referring to FIG. 2, in an embodiment of the present invention, a process for participating in the Internet auction website of the current invention begins with the potential seller and the potential buyer each registering with the financial institution's auction website S2, S12 by providing at least an e-mail address and payment account information. In prompting the seller and buyer for payment account information, the financial institution queries whether or not the seller or buyer holds an account with the financial institution S4, S14. When a seller or buyer asserts that they have an account with the financial institution, the financial institution then verifies that the seller and buyer are in fact financial institution account holders, that the account numbers for each are valid, and that each is in good standing S6, S16. If the selected account is not found or is not in good standing, registration is denied under that selected account S8, S18. This may be accomplished by, for example, an application on the website server which accesses financial institution account data stored, for example, in a financial institution database. In the verification process, the financial institution confirms, for example, that the credit cards are not stolen, that the cards are good, that the credit card accounts are paid on time or that the selected accounts (e.g., checking, savings, brokerage) are in good standing. In other words, the financial institution confirms that the accounts are viable and in good standing for purposes of financial transacting.

In an alternate embodiment, the buyer or seller may be prompted to select an alternate account under which to register. In this case, the system will again check the viability of the selected account prior to allowing registration. Though the verification is done over the Internet, a public network, account numbers are sent securely using, for example, encryption. Data transmission encryption techniques are well known in the Internet art and will not be discussed further within this application.

Once a viable account is selected, the website issues the buyer or seller a registration ID S10, S20. This ID may take many forms, including a username/password combination selected by the buyer and seller or it may be an alphanumeric code/personal identification number (PIN) assigned randomly by the financial institution, wherein the financial institution associates the selected user/password combination or the assigned code with the buyer or seller's selected account number.

Once issued a registration ID, the seller and buyer may gain access to the auction portion of the website and sell or bid on good(s). A seller lists good(s) on the website under his/her registration ID S22. Similarly, a buyer bids on listed good(s) using his/her registration ID S24. Eventually, a buyer will win the bidding for a listed good(s) S26. In the embodiment described above, both the buyer and seller hold accounts with the financial institution running the auction website. This need not necessarily be the case.

Figure 3:
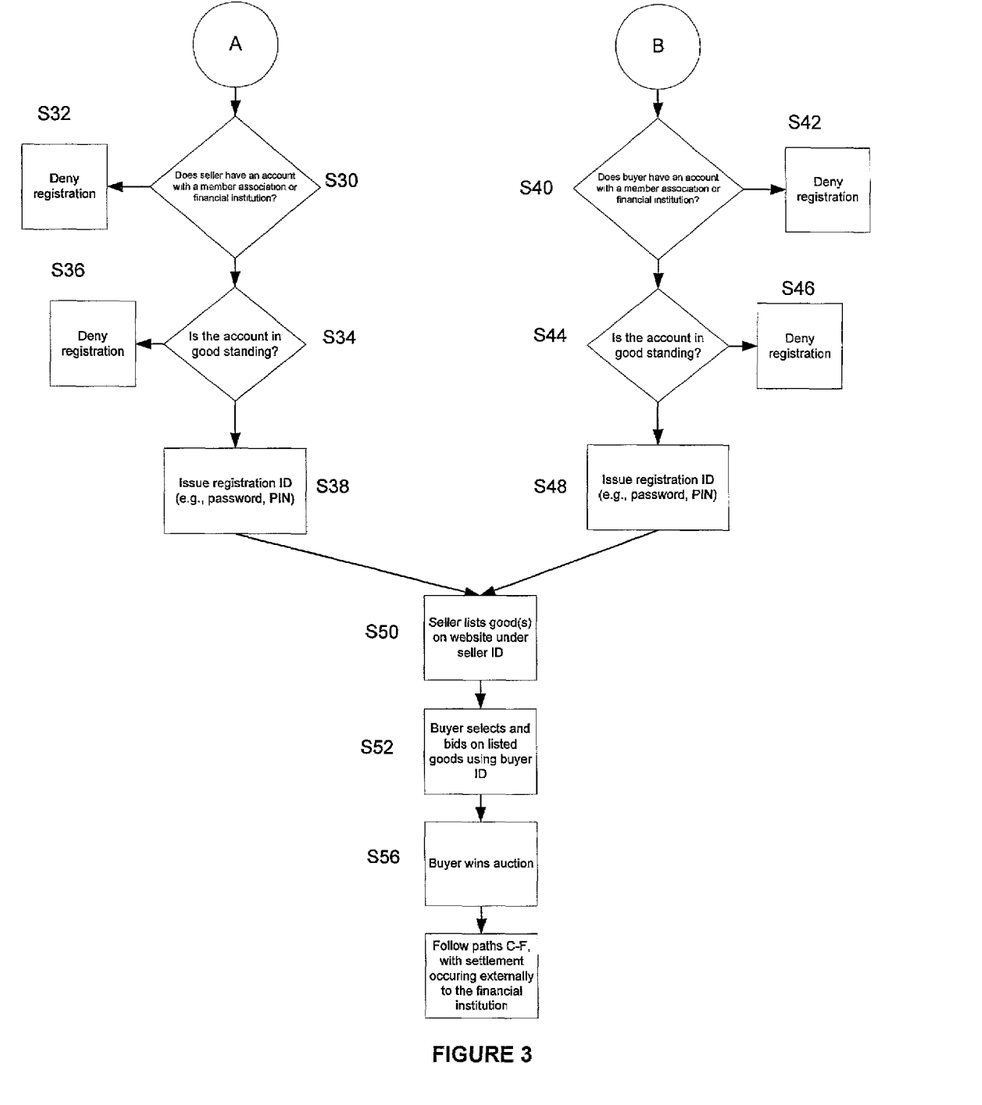
FIG. 3 is a registration process according to an embodiment of the present invention.

Referring to FIG. 3, non-account holders may also participate in the auction website if they hold credit cards from member associations or have other approved accounts with member financial institutions. Member associations and member financial institutions are pre-approved by the auction sponsoring financial institution. Similar to the registration process for the account holders, non-account holder sellers and buyers are prompted for payment account information and the financial institution queries whether or not the seller or buyer holds an account with a member association or member financial institution S30, S40. If no such account is held, then the buyer or seller is denied registration S32, S42. When a seller or buyer asserts that they have such an account with a member association or member financial institution, the sponsoring financial institution then verifies that the seller and buyer are in fact account holders with the member association or member financial institution, that the account numbers for each are valid, and that each is in good standing S34, S44. If the selected account is not found or is not in good standing, registration is denied under the selected account S36, S46.

Once a viable account is selected, the website issues the buyer or seller a registration ID S38, S48 wherein the sponsoring financial institution associates the assigned code with the buyer's or seller's selected account number held through a member association or member financial institution. When in possession of a registration ID, the seller and buyer may access the auction portion of the website and sell or bid on good(s). A seller lists good(s) on the website under his/her registration ID S50. Similarly, a buyer bids on listed good(s) using his/her registration ID S52. Eventually, a single buyer will win the bidding for a listed good(s) S56 assuming the bid requirements, if any, set by the seller are met (e.g., minimum acceptable bid is met).

In the following embodiments, the procedure for finalizing the auction transaction is the embodiment where both the buyer and the seller have registration IDs under accounts of the sponsoring financial institution. These steps are similarly applicable, in most instances, to embodiments wherein either the buyer or seller or both have registered with the Internet auction website using accounts from other than the sponsoring financial institution i.e., from a member association or member financial institution. Differences in the process due to non-sponsoring financial institution account holders are addressed below.

Once the buyer has won the bidding for a seller's good(s), the auction site has a data packet which includes the good(s) associated with the seller's registration ID which is in turn associated with an account that the seller used to register with the auction website. Further, the data packet includes the buyer's registration ID which is in turn associated with an account that the buyer used to register with the auction website. Finally, the data packet includes the final price bid for the good(s). At this point, settlement of the transaction may begin.

Figure 4:
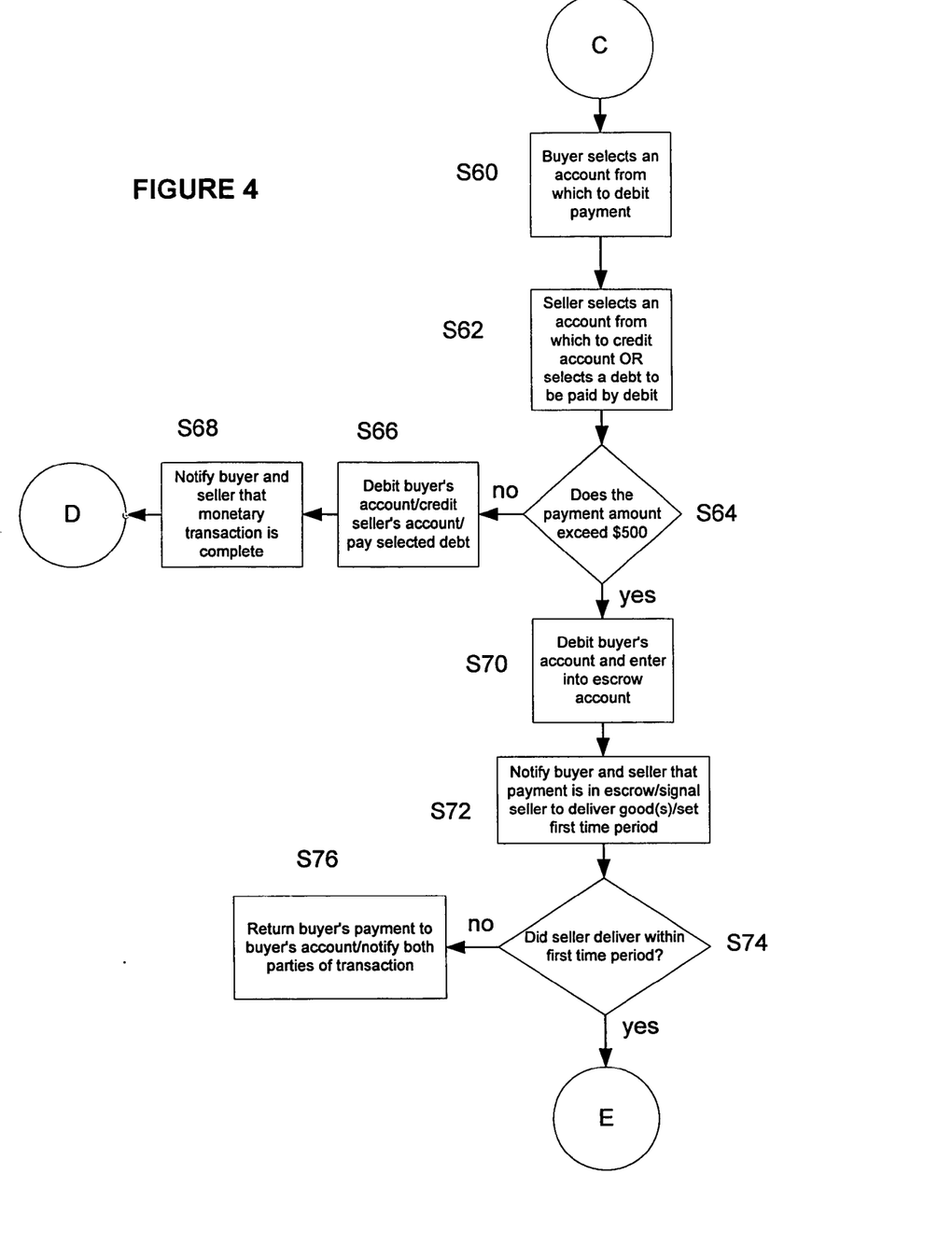
FIG. 4 is an auction payment process according to an embodiment of the present invention.

Referring to FIG. 4, in an embodiment of the present invention, the buyers and sellers having accounts with the sponsoring financial institution are prompted to select which account with the financial institution they wish to access for settling the transaction S60, S62. The buyer and seller in this embodiment are not required to settle the transaction with the same account under which they registered with the auction website. For any number of reasons (e, amount of funds, newly opened account), the buyer or seller may wish to debit or credit an account separate from the registering account. In the specific embodiment of FIG. 4, once both the buyer and seller have selected their respective accounts/bills, there are at least two payment scenarios, the first is an immediate transferal of the payment from buyer to seller, the second is a transferal of the payment into an escrow account wherein the money is only transferred to the seller upon the occurrence of certain events (e.g., buyer communicates receipt of good(s) to the financial institution). The methods and systems of the embodiments of the current invention may utilize one or both of these payment scenarios.

In a first particular embodiment of FIG. 4, selecting an exemplary amount for illustration purposes, if the final bid price is less than or equal to $500, the first, immediate payment scenario occurs. If the final bid price is greater than $500, the second escrow payment scenario is instituted. Consequently, after the buyer and seller select their respective accounts S60, S62, the system internally queries the bid price and compares it to the pre-determined threshold of $500 S64. If the final bid price is less than or equal to $500 than the buyer's selected account is immediately debited and the seller's selected account is immediately credited S66. Both parties are notified immediately via, for example, e-mail, that this transaction has been completed S68. The parties will also see the transaction on their monthly statements or on-line if the financial institution offers on-line interim statements for the selected accounts.

Figure 5:
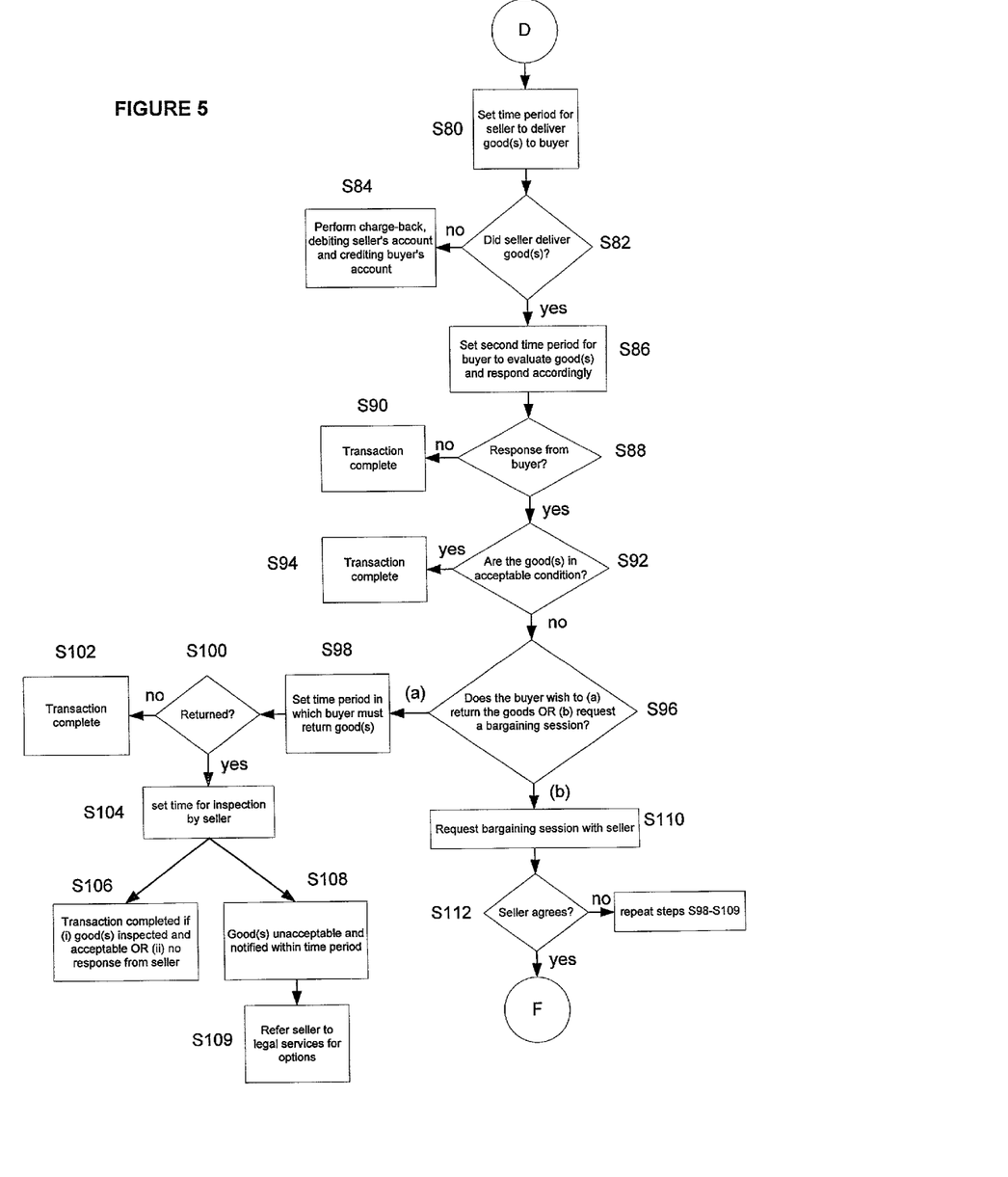
FIG. 5 is an auction payment process according to an embodiment of the present invention.

Following the method to FIG. 5, once the financial portion of the transaction has been completed for a bid price less than or equal to $500, a first time period is set for the seller to deliver the purchased good(s) to the buyer S80. The system queries whether or not the seller has delivered the good(s) within the first time period S82 (e.g., buyer notifies of receipt or lack of receipt). If the seller has not delivered the good(s) within the first time period, the financial institution performs a charge-back or similar transaction, wherein the bid price is taken back from the seller's selected account and credited to the buyer's selected account S84. This type of transaction is well known in the financial arts. The auction system may be structured such that the financial institution may charge-back the payment from an alternate account of the seller should the selected account not having the required funds.

Alternately, if the buyer has received the good(s) within the first time period, a second time period may be set for the buyer to inspect the good(s) to determine if they are conforming S86. The system queries whether or not the buyer responds within the second time period S88. If there is no response, then the transaction is considered to be complete S90. If the buyer does respond within the second time period regarding the good(s), the system queries whether or not the good(s) are in acceptable condition S92. If the good(s) are acceptable, the transaction is complete S94. If the good(s) are not acceptable, the auction system of the current embodiment offers the buyer one of two choice for completion of the transaction. The buyer may return the good(s) to the seller or the buyer may request a bargaining session with the seller via the auction system S96.

If the buyer chooses to return the good(s), a third time period is set for the buyer to return the good(s) to the seller S98. The system queries whether or not the good(s) have been returned within the third time period S100. If the good(s) are not returned within the third time period, the transaction is considered to be complete, since the payment has been made to the seller and the buyer presumably has the good(s) S102. If the good(s) are returned to the seller within the third time period, a fourth time period is set for the seller to inspect the returned good(s) to make sure they are in the original condition S104. The transaction is considered complete if the financial institution does not hear from the seller in the fourth time period or the seller notifies the financial institution that the good(s) are acceptable S106. Alternately, if the seller notifies the financial institution within the fourth time period that the good(s) are not acceptable S108, the financial institution may refer the seller to legal services to consider the sellers options at his point S109. As a service to the client, the financial institution may offer to reimburse the seller for the nonconformance, up to a set amount. The financial institution may also offer insurance for this sort of occurrence at a reasonable price as an option during the registration process.

Alternately, the buyer may elect to request a bargaining session with the seller due to the fact, for example, that although the good(s) are not in conformance, the buyer wishes to keep the good(s) but at a reduced price S110. In this case, a message is sent from the financial institution to the seller, notifying the seller that the good(s) were nonconforming, but that the buyer would like to request a bargaining session with the seller to further discuss the price. At this time, the seller may choose to engage in the bargaining session or the seller may request that the good(s) be returned S112. If the seller does not wish to engage in the bargaining session, the buyer may choose to keep the good(s) in which case the transaction is complete or the buyer may return the good(s) to the seller, in which case the steps S98-S109 are applicable.

Figure 7:
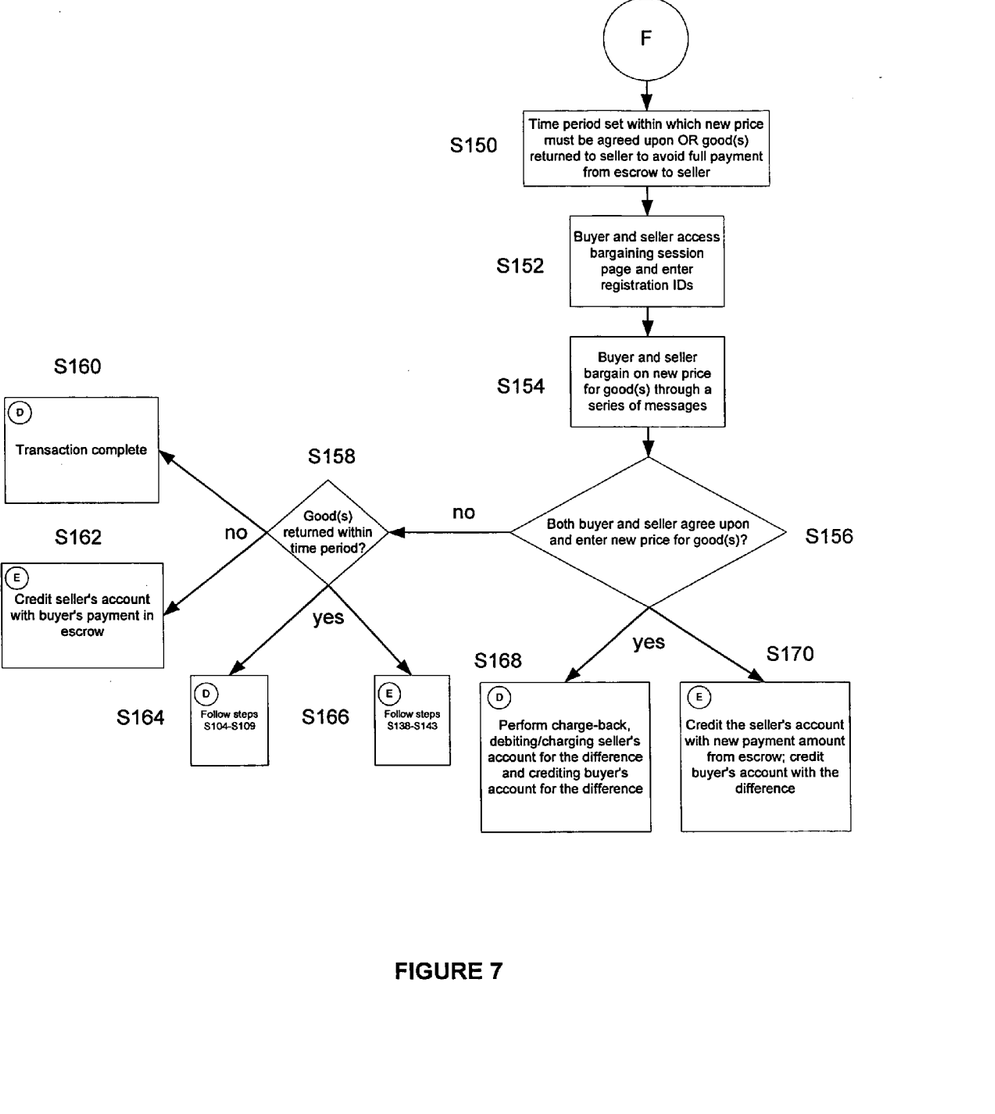
FIG. 7 is an auction payment process according to an embodiment of the present invention.

Assuming the seller agrees to the bargaining session, referring to FIG. 7, the buyer is notified of the sellers agreement to participate in a bargaining session and a time period is set within which a new price must be agreed upon or the good(s) must be returned to the seller in order to qualify for a charge-back S150. The Internet auction website provides a page for "BARGAINING SESSIONS," wherein the buyer and seller enter their respective registration IDs into the ID box and they are linked to a page containing the details of their original transaction S152. Additionally, a space is provided for a recitation as to the status of the good(s) as received and the reason for the request to lower the initially agreed upon price, as well as a new suggested payment price S154. This bargaining session may be limited to x number of messages between buyer and seller, or there may be an unlimited number of messages allowed between the buyer and seller. If the buyer and seller agree on a new price for the good(s), a page is provided to the buyer and seller for submitting the newly agreed upon price S156. The financial institution must receive the same price quote from both the buyer and the seller before, in this particular embodiment, a charge-back is performed, debiting the seller's account for the difference between the original bid price and the newly agreed upon price, and crediting the buyer's account for the difference S168. In the event that no new price quote is received from both the buyer and seller within the pre-established time period or the buyer does not inform the financial institution that the good(s) have indeed been returned to the seller within the pre-established time period S158, the transaction is considered to be complete in this embodiment S160. Assuming the good(s) are returned to the seller S164, presumably after an unsuccessful bargaining session, steps S104-S109 are followed.

In a second particular embodiment of FIG. 4, in the case where the final bid price exceeds $500, the system in this embodiment does not automatically transfer funds from a buyers account to a sellers account. In this embodiment, the buyer has a chance to inspect and accept the good(s) before the seller is credited from the buyer's account or accounts. The bid amount is deducted from the buyer's selected account and entered into an escrow account S70. This escrow account may take on various forms, but should be managed such that if the good(s) fail to meet the necessary requirements, the buyer is at the very least reimbursed for the original amount debited from his/her account. There are other management scenarios for the financial institutions escrow account, such as where the buyer actually receives interest back on the principle, in addition to the principle, in the case of non-conforming good(s) from the seller. This escrow account may take on various forms, but should be managed such that if the good(s) fail to meet the necessary requirements, the buyer is at the very least reimbursed for the original amount debited from his/her account. There are other management scenarios for the financial institution's escrow account, such as where the buyer actually receives interest back on the principle, in addition to the principle, in the case of non conforming good(s) from the seller. This escrow system may be a requirement of the financial institution's Internet auction system, it may be instituted on a transaction by transaction basis (e.g., all transactions over a pre-defined price as in FIG. 4), or it may be instituted at the request of either the buyer or seller as a prerequisite to engaging in business with a particular buyer or seller.

Once the buyer's account or accounts have been debited for the auctioned amount and deposited into the escrow account S70, the buyer and seller are notified of this transaction by the financial institution and the seller transfers the purchased good(s) to the buyer through an appropriate medium S72. This notification may be through any suitable means, such as e-mail, telephone, or mail, to name a few examples. After notification, the financial institution may start a time period for completion of the transaction (e.g., 5, 10, 15 days). If the seller does not deliver the good(s) within the first time period S74, the buyer's payment is returned to the buyer's account S76. Alternatively, referring to FIG. 6, if the buyer has received the good(s) within the first time period, a second time period may be set for the buyer to inspect the good(s) to determine if they are conforming S120. The system queries whether or not the buyer responds within the second time period S122. If there is no response, then the seller is credited with the buyer's payment from the escrow account S124. If the buyer does respond within the second time period regarding the good(s), the system queries whether or not the good(s) are in acceptable condition S126. If the good(s) are acceptable, then the seller is credited with the buyer's payment from the escrow account S128. If the good(s) are not acceptable, the auction system of the current embodiment offers the buyer one of two choice for completion of the transaction. The buyer may return the good(s) to the seller or the buyer may request a bargaining session with the seller via the auction system S130.

Figure 6:
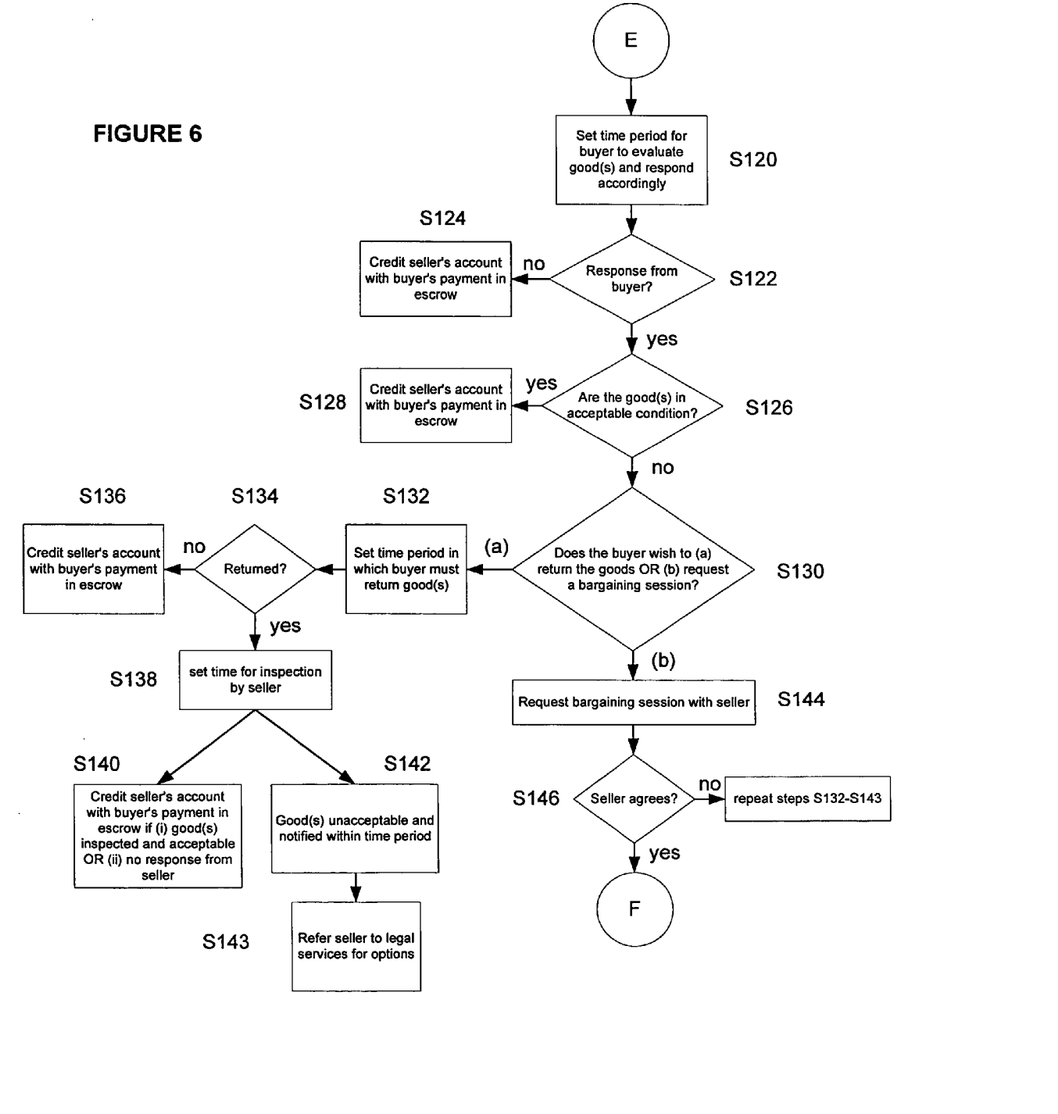
FIG. 6 is an auction payment process according to an embodiment of the present invention.

If the buyer chooses to return the good(s), a third time period is set for the buyer to return the good(s) to the seller S132. The system queries whether or not the good(s) have been returned within the third time period S134. If the good(s) are not returned within the third time period, then the seller is credited with the buyer's payment from the escrow account since the buyer presumably has the good(s) S136. If the good(s) are returned to the seller within the third time period, a fourth time period is set for the seller to inspect the returned good(s) to make sure they are in the original condition S138. The seller is credited with the buyer's payment from the escrow account if the financial institution does not hear from the seller in the fourth time period or the seller notifies the financial institution that the good(s) are acceptable S140. Alternately, if the seller notifies the financial institution within the fourth time period that the good(s) are not acceptable S142, the financial institution may refer the seller to legal services to consider the sellers options at his point S143. As a service to the client, the financial institution may offer to reimburse the seller for the nonconformance, up to a set amount. The financial institution may also offer insurance for this sort of occurrence at a reasonable price as an option during the registration process.

Alternately, the buyer may elect to request a bargaining session with the seller due to the fact, for example, that although the good(s) are not in conformance, the buyer wishes to keep the good(s) but at a reduced price S144. In this case, a message is sent from the financial institution to the seller, notifying the seller that the good(s) were nonconforming, but that the buyer would like to request a bargaining session with the seller to further discuss the price. At this time, the seller may choose to engage in the bargaining session or the seller may request that the good(s) be returned S146. If the seller does not wish to engage in the bargaining session, the buyer may choose to keep the good(s) in which case the seller is credited with the buyer's payment from the escrow account or the buyer may return the good(s) to the seller, in which case the steps S132-S143 may be applicable.

Assuming the seller agrees to the bargaining session, referring to FIG. 7, the buyer is notified of the sellers agreement to participate in a bargaining session and a time period is set within which a new price must be agreed upon or the good(s) must be returned to the seller in order to qualify for a charge-back S150. The Internet auction website provides a page for "BARGAINING SESSIONS," wherein the buyer and seller enter their respective registration IDs into the ID box and they are linked to a page containing the details of their original transaction S152. Additionally, a space is provided for a recitation as to the status of the good(s) as received and the reason for the request to lower the initially agreed upon price, as well as a new suggested payment price S154. This bargaining session may be limited to x number of messages between buyer and seller, or there may be an unlimited number of messages allowed between the buyer and seller. If the buyer and seller agree on a new price for the good(s), a page is provided to the buyer and seller for submitting the newly agreed upon price S156. The financial institution must receive the same price quote from both the buyer and the seller before, in this particular embodiment, the seller's account is credited with the new price from the escrow account and the buyer's account is credited from the escrow account for the difference S170. In the event that no new price quote is received from both the buyer and seller within the pre-established time period or the buyer does not inform the financial institution that the good(s) have indeed been returned to the seller within the pre-established time period S158, the seller's account is credited with the original amount from escrow in this embodiment S162. Assuming the good(s) are returned to the seller S166, presumably after an unsuccessful bargaining session, steps S138-S143, respectively, may be followed.

A further advantage of the preferred embodiment is the ability of the seller to apply the payment from the buyer to any account or bill currently available for payment through the financial institution. For example, many financial institutions offer services, on-line or otherwise, for automatically paying bills for their customer's from the accounts of the customer's managed by the financial institution. In a preferred embodiment of the present invention, the seller may specifically request that the profit from the on-line auction be directed to, for example, their mortgage payment, car loan, student loan, etc. instead of first going to the seller's checking account and then later being debited therefrom to pay these types of bills.

As discussed with reference to FIG. 3 another aspect of an embodiment of the present invention relates to verification in an Internet auction transaction for a financial account holder who is not a sponsoring financial institution account holder. Such an aspect involves, for example, an arrangement with the certain credit card associations (e.g., Visa®, MasterCard®) or non-sponsoring financial institutions (e.g., Chase, First Union) in connection with authentication of non-sponsoring financial institution account holders. Such non-sponsoring financial institution account holders are allowed to participate in the auction system in an embodiment of the present invention and are allowed to buy on the system and to use their non sponsoring financial institution accounts to charge the bid price of the good(s). However, non-sponsoring financial institution account holders and/or the non-sponsoring financial institutions or associations may be charged a fee.

As discussed above, the non-sponsoring financial institutions or associations may become member associations and member financial institutions through arrangements with the sponsoring financial institution. Upon becoming a member association or member financial institution, account holders with these member associations and/or member financial institutions may use the auction website, subject to the registration and verification processes described above.

In an embodiment of the present invention, for a buyer who is an account holder with a member association and/or member financial institution, the sponsoring financial institution, for example, charges the member association and/or member financial institution account holder for the bid price and issues a check to the seller. Thus, the sponsoring financial institution basically guarantees that the buyer is real, and the sponsoring financial institution looks to the buyer for payment of the money charged on the member association and/or member financial institution account. In other words, the sponsoring financial institution takes the collection risk like it does on any other transaction.

As part of the verification and settlement proceedings with member associations and/or member financial institutions, the sponsoring institution may check on the available credit of the member association account holders through conventional credit card authorization lines. Further, the sponsoring institution may, for example, check the availability of funds through the pre-established ATM lines, prior to allowing sellers and buyers to register with the Internet auction website. The sponsoring financial institution may also use the ATM lines to check the availability of a buyer's funds at the member financial institution, prior to releasing funds to a seller after a bid price has been reached. The sponsoring financial institution would then release the funds to the seller and begin external settlement proceedings with the member financial institution.

A further feature of the Internet auction website is the ability of the sponsoring financial institution to track auction performance histories of buyers and sellers who utilize the system. These performance histories include payment and delivery histories of the buyers and sellers as well as purchasing histories of particular buyers and product conformance histories of particular sellers. Using this information, the financial institution may provide information on the reputation of a particular buyer or seller to other prospective buyers and sellers to help facilitate use of the system by trustworthy individuals. Further, by tracking the purchasing habits of buyers, the financial institution may offer as a service to its buyers, notification that certain types of goods have been listed on the auction website. For example, if the financial institution establishes through tracking that a particular buyer frequently purchases antiques, when an antique is listed on the auction website, the financial institution would notify the particular buyer of this new antique listing. This notification could be in the form of, for example, an e-mail, or even a page depending on the arrangement between the buyer and the financial institution.

Finally, in a similar alternate embodiment, the financial institution may offer a service to potential buyers, wherein the potential buyers specifically request to be alerted when a particular type of good is listed on the website. For example, a potential buyer may be interested in purchasing a computer. The potential buyer requests that the financial institution alert the buyer whenever a computer is listed on the auction website. The alert may be provided through any available media, i.e., e-mail, pager, etc.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

I claim:

1. A method for conducting an auction website operated by a sponsoring financial institution comprising:

registering potential buyers and sellers for the auction website by verifying that the potential buyers and sellers have at least one active account with the sponsoring financial institution;

upon verification of at least one active account, issuing an individual registration identification to each of the potential buyers and sellers having at least one active account with the sponsoring financial institution, wherein the individual registration identification is associated with the at least one active account;

facilitating access to the auction website through a network;

listing goods of registered sellers on the auction website;

accepting bids from registered potential buyers for listed goods of registered sellers through the auction website;

recognizing (i) a final bid amount for at least one good listed by a registered seller and (ii) a registered buyer who bids the final bid amount for the at least one good;

prompting the registered buyer of the at least one good to select a buyer's payment account and the registered seller of the at least one good to select a seller's payment account;

comparing the final bid amount to a pre-determined threshold amount to determine a preferred payment process, wherein the preferred payment process when the final bid amount is above the pre-determined threshold amount includes:

debiting the buyer's selected payment account for the final bid amount; and depositing the final bid amount into an escrow account; and facilitating settlement between the buyer payment account and the seller payment account both held at the sponsoring financial institution, wherein facilitating settlement between the buyer's payment account and the seller's payment account includes:

setting a first time period within which the seller must deliver the good to the buyer;

when the seller delivers the good to the buyer within the first time period, setting a second time period within which the buyer inspects the goods to determine conformance; and when either (i) the buyer acknowledges conformance of the good within the second time period or (ii) the second time period expires with no further contact from the buyer, retrieving the final bid amount from the escrow account; and crediting the final bid amount to the seller's payment account.

2. A method for conducting an auction website operated by a sponsoring financial institution comprising:

registering potential buyers and sellers for the auction website by verifying that the potential buyers and sellers have at least one active account with the sponsoring financial institution;

upon verification of at least one active account, issuing an individual registration identification to each of the potential buyers and sellers having at least one active account with the sponsoring financial institution, wherein the individual registration identification is associated with the at least one active account;

facilitating access to the auction website through a network;

listing goods of registered sellers on the auction website;

accepting bids from registered potential buyers for listed goods of registered sellers through the auction website;

recognizing (i) a final bid amount for at least one good listed by a registered seller and (ii) a registered buyer who bids the final bid amount for the at least one good;

prompting the registered buyer of the at least one good to select a buyer's payment account and the registered seller of the at least one good to select a seller's payment account;

comparing the final bid amount to a pre-determined threshold amount to determine a preferred payment process, wherein the preferred payment process when the final bid amount is above the pre-determined threshold amount includes:
  debiting the buyer's selected payment account for the final bid amount; and
  depositing the final bid amount into an escrow account; and
  facilitating settlement between the buyer payment account and the seller payment account both held at the sponsoring financial institution, wherein facilitating settlement between the buyer's payment account and the seller's payment account includes:
  setting a first time period within which the seller must deliver the good to the buyer;
  when the seller delivers the good to the buyer within the first time period, setting a second time period within which the buyer must inspect the goods to determine conformance;
  when the buyer determines that the good is non-conforming, setting a third time period within which the buyer either (iii) returns the good to the seller or (iv) requests a bargaining session with the seller;
  when the buyer returns the good to the seller within the third time period, setting a fourth time period within which the seller inspects the good to determine if the good is in the same condition as it was in when it was originally sent to the buyer; and
  when the seller determines that the good is in the same condition, retrieving the final bid amount from the escrow account; and
  returning the final bid amount to the buyer's payment account.

3. A method for conducting an auction website operated by a sponsoring financial institution comprising:
  registering potential buyers and sellers for the auction website by verifying that the potential buyers and sellers have at least one active account with the sponsoring financial institution;
  upon verification of at least one active account, issuing an individual registration identification to each of the potential buyers and sellers having at least one active account with the sponsoring financial institution, wherein the individual registration identification is associated with the at least one active account;
  facilitating access to the auction website through a network;
  listing goods of registered sellers on the auction website;
  accepting bids from registered potential buyers for listed goods of registered sellers through the auction website;
  recognizing (i) a final bid amount for at least one good listed by a registered seller and (ii) a registered buyer who bids the final bid amount for the at least one good;
  prompting the registered buyer of the at least one good to select a buyer's payment account and the registered seller of the at least one good to select a seller's payment account;
  comparing the final bid amount to a pre-determined threshold amount to determine a preferred payment process, wherein the preferred payment process when the final bid amount is above the pre-determined threshold amount includes:
  debiting the buyer's selected payment account for the final bid amount; and
  depositing the final bid amount into an escrow account; and
  facilitating settlement between the buyer payment account and the seller payment account both held at the sponsoring financial institution, wherein facilitating settlement between the buyer's payment account and the seller's payment account includes:
  setting a first time period within which the seller must deliver the good to the buyer;
  setting a second time period within which the buyer must inspect the goods to determine conformance when the seller delivers the good to the buyer within the first time period;
  setting a third time period within which the buyer either (iii) returns the good to the seller or (iv) requests a bargaining session with the seller when the buyer determines that the good is non-conforming;
  setting a fourth time period within which the buyer and the seller negotiate a new bid price for the good when the buyer requests a bargaining session with the seller and the seller agrees to the bargaining session;
  comparing the final bid price to the new bid price to determine a difference, when an identical new bid price is received from both the buyer and seller within the fourth time period;
  retrieving the final bid price from the escrow account;
  returning an amount equal to the difference to the buyer's payment account; and
  crediting the seller's payment account with the new bid price.

4. A method for conducting an auction website operated by a sponsoring financial institution comprising:
  registering potential buyers and sellers for the auction website by verifying that the potential buyers and sellers have at least one active account with the sponsoring financial institution;
  upon verification of at least one active account, issuing an individual registration identification to each of the potential buyers and sellers having at least one active account with the sponsoring financial institution, wherein the individual registration identification is associated with the at least one active account;
  facilitating access to the auction website through a network;
  listing goods of registered sellers on the auction website;
  accepting bids from registered potential buyers for listed goods of registered sellers through the auction website;
  recognizing (i) a final bid amount for at least one good listed by a registered seller and (ii) a registered buyer who bids the final bid amount for the at least one good;
  prompting the registered buyer of the at least one good to select a buyer's payment account and the registered seller of the at least one good to select a seller's payment account;
  comparing the final bid amount to a pre-determined threshold amount to determine a preferred payment process, wherein the preferred payment process when the final bid amount is below the pre-determined threshold amount includes:
  debiting the buyer's selected payment account for the final bid amount and crediting the seller's selected payment account with the final bid amount; and
  facilitating settlement between the buyer payment account and the seller payment account both held at the sponsoring financial institution, wherein facilitating settlement between the buyer's payment account and the seller's payment account includes:
  setting a first time period within which the seller must deliver the good to the buyer;
  when the buyer does not receive the good from the seller within the first time period, returning the final bid amount to the buyer's payment account and charging the seller's payment account with the final bid amount.

5. A method for conducting an auction website operated by a sponsoring financial institution comprising:

registering potential buyers and sellers for the auction website by verifying that the potential buyers and sellers have at least one active account with the sponsoring financial institution;

upon verification of at least one active account, issuing an individual registration identification to each of the potential buyers and sellers having at least one active account with the sponsoring financial institution, wherein the individual registration identification is associated with the at least one active account;

facilitating access to the auction website through a network;

listing goods of registered sellers on the auction website;

accepting bids from registered potential buyers for listed goods of registered sellers through the auction website;

recognizing (i) a final bid amount for at least one good listed by a registered seller and (ii) a registered buyer who bids the final bid amount for the at least one good;

prompting the registered buyer of the at least one good to select a buyer's payment account and the registered seller of the at least one good to select a seller's payment account;

comparing the final bid amount to a pre-determined threshold amount to determine a preferred payment process, wherein the preferred payment process when the final bid amount is below the pre-determined threshold amount includes:

debiting the buyer's selected payment account for the final bid amount and crediting the seller's selected payment account with the final bid amount; and facilitating settlement between the buyer payment account and the seller payment account both held at the sponsoring financial institution, wherein facilitating settlement between the buyer's payment account and the seller's payment account includes:

setting a first time period within which the seller must deliver the good to the buyer;

setting a second time period within which the buyer must inspect the goods to determine conformance when the seller delivers the good to the buyer within the first time period;

setting a third time period within which the buyer either (iii) returns the good to the seller or (iv) requests a bargaining session with the seller when the buyer determines that the good is non-conforming;

setting a fourth period within which the buyer and the seller negotiate a new bid price for the good when the buyer requests a bargaining session with the seller and the seller agrees to the bargaining session;

comparing the final bid amount to the new bid price to determine a difference when an identical new bid price is received from both the buyer and seller within the fourth period;

crediting an amount equal to the difference to the buyer's payment account; and debiting the seller's payment account for an amount equal to the difference.

* * * * *